US007546528B2

(12) United States Patent
Barrus et al.

(10) Patent No.: US 7,546,528 B2
(45) Date of Patent: Jun. 9, 2009

(54) STAMP SHEETS

(75) Inventors: John Barrus, Menlo Park, CA (US);
 Ame Elliott, San Francisco, CA (US);
 Kurt Piersol, Campbell, CA (US);
 Bradley Rhodes, Mountain View, CA (US); Stephen Savitzky, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 413 days.

(21) Appl. No.: 11/018,154

(22) Filed: Dec. 20, 2004

(65) Prior Publication Data

US 2006/0133670 A1 Jun. 22, 2006

(51) Int. Cl.
*G06F 17/00* (2006.01)
(52) U.S. Cl. ...................... 715/255; 715/201
(58) Field of Classification Search ............. 715/500, 715/526, 201, 273, 255; 382/317
See application file for complete search history.

(56) References Cited

U.S. PATENT DOCUMENTS

| 5,680,223 | A | * | 10/1997 | Cooper et al. ............ 358/403 |
| 5,867,821 | A | * | 2/1999 | Ballantyne et al. ......... 705/2 |
| 5,870,552 | A | * | 2/1999 | Dozier et al. ............ 709/219 |
| 6,009,442 | A | * | 12/1999 | Chen et al. ............. 715/205 |
| 6,892,193 | B2 | * | 5/2005 | Bolle et al. ............. 706/20 |
| 6,976,229 | B1 | * | 12/2005 | Balabanovic et al. ...... 715/838 |
| 7,146,367 | B2 | * | 12/2006 | Shutt .................... 707/9 |
| 2002/0020750 | A1 | * | 2/2002 | Dymetman et al. ..... 235/472.01 |
| 2003/0130952 | A1 | * | 7/2003 | Bell et al. .............. 705/51 |
| 2003/0161003 | A1 | * | 8/2003 | Herbert ................ 358/1.18 |
| 2004/0025180 | A1 | * | 2/2004 | Begeja et al. ............ 725/46 |
| 2005/0162686 | A1 |   | 7/2005 | Barrus |

FOREIGN PATENT DOCUMENTS

EP 1 016 953 A2 7/2000

OTHER PUBLICATIONS

Graham, Adrian, et al, "Image and Cultural Digital Libraries: Time as Essence for Photo Browsing THrough Personal Dgitial Libraries", Proceedings of the 2nd ACM/IEEE-CS Join Conference on Digital Libraries JCDL '02, Jul. 2002, pp. 326-335.*
European Search Report, Application No. EP 05 02 7869, mailed Apr. 6, 2006, (4 pgs.).

* cited by examiner

*Primary Examiner*—Laurie Ries
(74) *Attorney, Agent, or Firm*—Blakely, Sokoloff, Taylor & Zafman LLP

(57) ABSTRACT

A method and apparatus for creating and/or using a stamp sheet is described. In one embodiment, the method comprises receiving a first image of a first overview of a first collection of media objects, where the first image has graphical content representing the media objects and a first machine readable pointer to identify the first collection. The method also includes receiving a second image of a second overview of a second collection of media objects, wherein the second image has graphical content representing the media objects and a second machine readable pointer to identify the second collection, and identifying at least one location in at least one indication area on the first image having a mark therein, where the location being associated with graphical content represents at least one of the media objects. The method also includes adding the at least one media object to the second collection.

44 Claims, 8 Drawing Sheets

STAMP SHEETS

CROSS REFERENCE TO RELATED APPLICATIONS

This application is related to the following commonly owned and co-pending U.S. patent applications:

U.S. patent application Ser. No. 10/816,049, filed Mar. 31, 2004, entitled "CHECK BOXES FOR IDENTIFYING AND PROCESSING STORED DOCUMENTS."

FIELD OF THE INVENTION

The present invention relates generally to the field of document management and more specifically to managing the use of stamps with sheets representing collections of multimedia documents.

BACKGROUND OF THE INVENTION

Despite the ideal of a paperless environment that the popularization of computers had promised, paper continues to dominate the office landscape. Ironically, the computer itself has been a major contributing source of paper proliferation. The computer simplifies the task of document composition, and thus has enabled even greater numbers of publishers. The computer promotes individual expression through the use of graphics tools, image capture devices, image enhancement tools, and so on, in addition to traditional text editing. Oftentimes, documents must be shared among colleagues, thus generating even more paper.

Despite advances in technology, suitable personal output devices as a practical substitute for paper remain to be developed. Personal data assistants (PDAs such as the Treo® by palmOne, Inc., and similar hand held devices) typically do not have the storage capacity, the processing capacity, the display capacity, or the connectivity to effectively present documents to the user in a convenient and useful manner. Unlike paper, devices such as PDAs are not universal. While many document formats exist for representing information, not all devices have all the software needed to read all documents. Worse yet, PDA documents typically use formats that are not readily available on a desktop or laptop PC. Usually, documents have to be converted between formats. Thus, paper remains the simplest way in many situations for storing information (e.g., record keeping), distributing information, and controlling access to information.

Paper has been an integral component of civilization for thousands of years. Its replacement is not likely to occur soon, if ever, despite the ubiquity of computer-based technology. Electronic information almost invariably is reduced, at least in part, to paper. Perhaps then, the role of the computer is not to achieve a paperless society. Instead, the role of the computer may be as a tool to move effortlessly between paper and electronic media with which it was created. Generally, there is a need to use computers to more effectively share information and to provide access to that information. In addition, the information should not be limited to any particular mode of expression, allowing for all forms of communication media.

A cover sheet, as used in a Collection Managersystem of Ricoh Innovations, Inc. of Menlo Park, Calif., is typically a paper document that provides access to and management of a collection of arbitrary media files. Each cover sheet typically contains a machine-readable identifier for the collection as well as a graphic or image representing the contents of the collection. When a modification occurs to the collection, the graphic that appears on the cover sheet must be changed. However, to reflect those changes, a new paper cover sheet must be printed.

Many office tasks require collections of documents to be processed as part of the office workflow. Stamping documents as part of an office workflow has been performed for years. Office workers often have a collection of rubber stamps in their desk. These office workers are comfortable with marking a paper document to indicate that the paper document has been processed in some way or that the paper document has some special significance. For example, an "URGENT" stamp on a piece of paper may indicate that it should be addressed immediately, while a "PAID" stamp on an invoice may indicate that a check has been cut and the invoice can be filed.

MFP collections are often used to store documents related to transactions like purchase requests and expense reports. It would be desirable to be able to "stamp" them in the same way that paper documents are stamped in order to visually communicate that the collection is in a specific state.

SUMMARY OF THE INVENTION

A method and apparatus for creating and/or using a stamp sheet is described. In one embodiment, the method comprises receiving a first image of a first overview of a first collection of media objects, where the first image has graphical content representing the media objects and a first machine readable pointer to identify the first collection. The method also includes receiving a second image of a second overview of a second collection of media objects, wherein the second image has graphical content representing the media objects and a second machine readable pointer to identify the second collection, and identifying at least one location in at least one indication area on the first image having a mark therein, where the location being associated with graphical content represents at least one of the media objects. The method also includes adding the at least one media object to the second collection.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
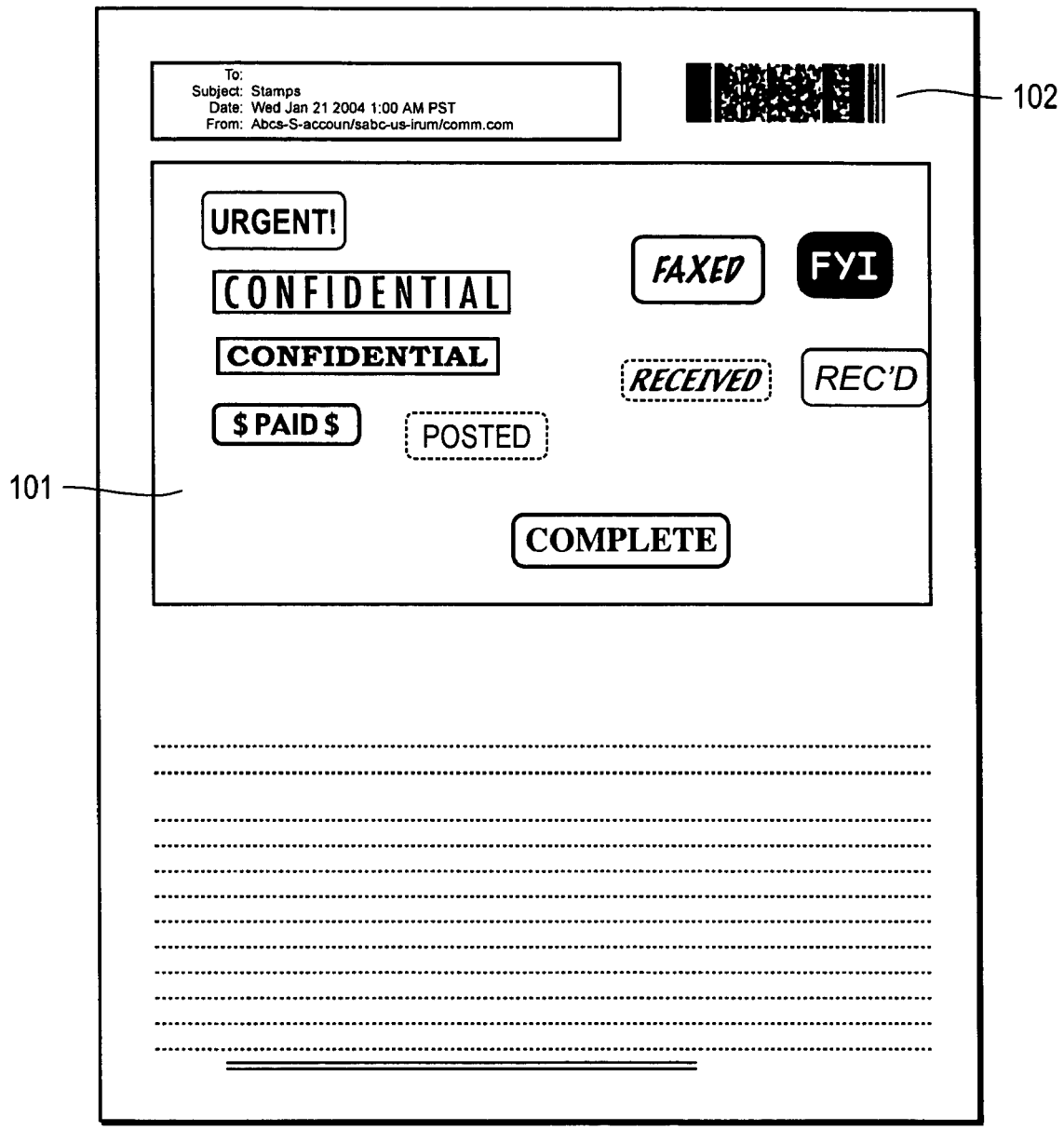
FIG. 1 illustrates a collection that contains a number of images that might be appropriate for marking collections.

A method and apparatus for stamping multimedia document collections is described. Embodiments of the present invention use electronic collections to apply stamps to other collections, meeting the same needs met by rubber stamps in the paper world.

Embodiments of the present invention include a method and apparatus to convert a collection of images into a "stamp" collection, which is a collection that can be used for annotating or stamping other collections.

In one embodiment, the collections may be represented with cover sheets. The cover sheet provides access to and management of a collection of arbitrary media objects through the use of an identifier (e.g., a machine-readable identifier, such as, for example, a barcode). Media objects may include scanned documents, images, audio files, text notes, annotations (drawing marks), web pages, and office documents like spreadsheets and presentations. The media objects may be represented by a set of thumbnails on the cover sheet. Other representations may be used.

The terms "paper," "paper medium," or "sheet" as used in this application are intended to refer to any tangible medium on which information can be formed whether by a printing process, written, drawn, imprinted, embossed, etc. For purposes of this invention, the term "printing" is intended to encompass all manner of forming images on an image-bearing medium whether by optical, mechanical, thermal, or electrical methods, or combinations thereof.

Collections in this specification have a specific meaning. A "collection" can include one or more groups of electronic documents or media which might include digital images, audio recordings, scanned images from pages of a document, files like Microsoft Word documents or Microsoft Excel spreadsheets. Collections can also contain pointers to other collections. Collections can include user-provided markings, annotations, and such. Collections can also include metadata representing related information such as date of creation, modification date, access permissions, and so on.

A collection is stored on a collection server and has a specific address or identifier, similar to a URL or uniform resource locator, which identifier is unique and provides a pointer to the collection. A collection has a coversheet that displays a representation of the contents of the collection with an overview image showing thumbnails that represent all of the documents in the collection. More details about collections will be described in another part of this specification.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In this application, the following terms are used:

"Document" refers to any collection of information capable of being stored electronically, including but not limited to text, word processing and spreadsheet files, e-mail messages, voice and audio recordings, images, archives of documents, and video recordings.

"Identifier sheet" refers to a piece of paper or other readable media item that identifies a stored document or collection of documents. As described in reference related patent applications, the identifier sheet may be a collection cover sheet or may take on any other form. In one embodiment, the identifier sheet includes a document identifier and/or collection identifier that may be computer-readable, human-readable, or any combination thereof. Identifier sheets are also referred to herein as "document indexes."

One type of identifier sheet is a "collection coversheet." A collection coversheet identifies a collection and also includes representations of documents within the collection. In one embodiment, a collection coversheet includes:

A collection identifier in machine-readable form (such as a barcode) and/or human-readable form (such as a Uniform Resource Locator (URL) or other text string). The collection identifier provides information describing a location of the collection, such as a directory or folder containing documents in the collection.

A collection overview, which represents documents in the collection by thumbnails. Thumbnails are associated with positions in the overview. For instance, the thumbnail for document A might be in the upper left corner of the collection overview, and the thumbnail for document B might be in the lower right corner.

Further description of collection coversheets, collection identifiers, and collection overviews can be found in related patent applications referenced above and are discussed in more detail below.

For illustrative purposes, the following description sets forth the invention in terms of check boxes and other indication or selection areas on collection coversheets. However, one skilled in the art will recognize that the invention can also be implemented using check boxes on other types of identifier sheets, document indexes, or media items that identify stored documents, and that such implementations would not depart from the essential characteristics of the present invention.

FIG. 1 illustrates a collection that contains a number of images 101 that might be appropriate for marking collections. Using the techniques described herein, a system such as, but not limited to, an MFP, may be used to create a new collection showing organized stamp images with corresponding checkboxes and a placement indicator like that shown in FIG. 2. The check boxes may be used by an individual to select one or more stamps to be added to a collection, while the placement indicator may be used by an individual to indicate where in the collection the one or more stamps are to be added.

In one embodiment of the system, the coversheet shown in FIG. 1 is reprinted with check boxes added next to each thumbnail or stamp (graphical content or depiction) and the coversheet with checkboxes is used to add one or more stamps to another collection.

Figure 2:
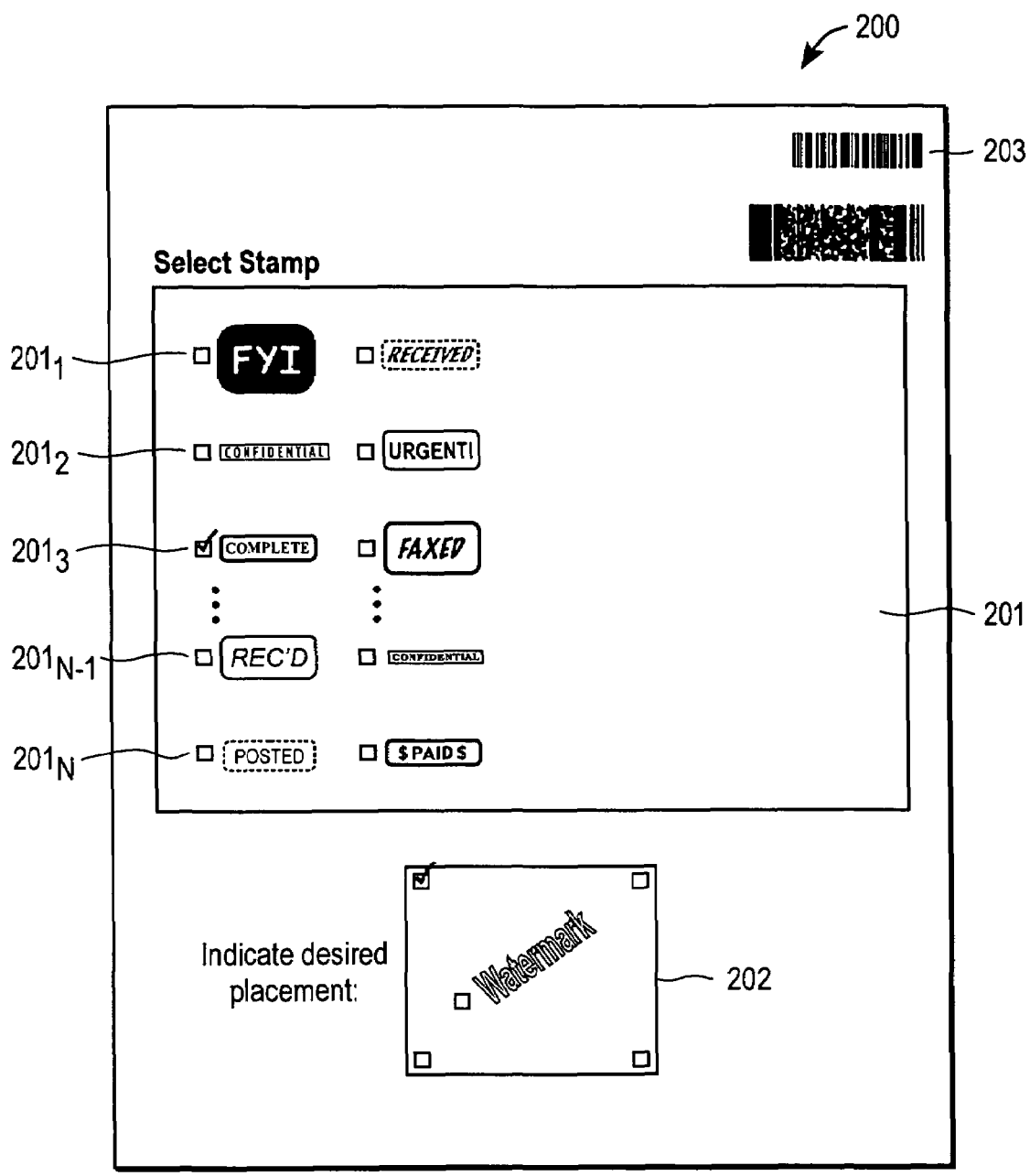
FIG. 2 illustrates an exemplary collection made from the collection of images shown in FIG. 1.

The stamp sheet shown in FIG. 2 can be created based on the collection shown in FIG. 1 using the present invention. In one embodiment, when the system scans the collection coversheet 103 of FIG. 1, it reads machine readable code 102 in the upper right corner of coversheet 103. In one embodiment, the system converts machine readable code 102 to a Distributed Resource Identifier or DRI or equivalent data which gives the storage location of the electronic collection. A DRI is like a URL in this exemplary case. At the location of the electronic collection, a file is stored that contains information about each of the items in the collection. Each item is shown as a thumbnail in the coversheet overview image 101. In this example, there are 10 electronic items shown in the coversheet and contained in the collection. Each item has a unique image that represents the item and a thumbnail of the image is shown on coversheet 103.

In one embodiment, to create the stamp sheet 200 of FIG. 2, the thumbnail of each item is organized in a grid and a checkbox (e.g., $201_{1-N}$) is placed beside each item. In addition, in one embodiment, a placement legend 202 is added to the area of the coversheet beneath the overview thumbnails. Alternatively, placement legend 202 is located on another portion of stamp sheet 200. A new collection is created containing these stamp items and a new map is created that correlates the individual items to a location in the overview image. This map is accessed whenever the stamp sheet is used to tell the system which check box corresponds to each stamp.

The system of the present invention is capable of recognizing selected, or marked, check boxes regardless of the marks made in them. The user may mark the check box by filling in the check box completely or putting another mark (e.g., a check mark) in the box. In one embodiment, if any of the checkboxes has a dark pixel, it is considered marked. In consideration of the fact that sometimes small bits of dust or noise in the scanning mechanism might form a dark pixel, it is desirable to remove individual dark pixels or small dots from the checkbox image before deciding if it has been marked. Removing noise from images is well understood in the art and is typically done using morphological operations. For a description of morphological operations, see Dougherty, Edward R; Jaakko Astola, "An Introduction to Nonlinear Image Processing" (Vol TT16) Tutorial texts in optical engineering, O'Shea, Donald ed., SPIE Optical Engineering Press, Bellingham, Wash., 1994.

Check boxes as shown in FIG. 2 are square shaped and are next to, or in close proximity to, an image of a word indicating the desired stamp (e.g., "Urgent"). Other formats and shapes (e.g., circles, ovals, etc.) are possible and will be recognized by one skilled in the art in light of this description. For example, another form of indication may be circular or elliptical to provide a user an area to mark to specify an action.

In one embodiment, such an arrangement would signal to the MFP of the present invention that the selected stamp(s) corresponding to thumbnails located by the selected check boxes should be added on the document collection that follows the stamp sheet. Thus, stamp images selected on one collection cover sheet can be added to the collection associated with the collection cover sheet that follows the stamp sheet in the scanner.

FIG. 2 illustrates an exemplary collection made from the collection of images shown in FIG. 1. Each time a user wants to annotate a collection with one of the stamps shown in FIG. 2, the user checks a check box (e.g., $201_{1-N}$) next to the desired stamp and indicates on the bottom of the document in the placement indicator area 202 where the stamp should go in the collection. If the user checks the "COMPLETE" stamp and places a check in the upper left box, of the placement indicator, then the system adds the "COMPLETE" stamp to the upper left corner of the second collection. The new collection coversheet then has a visible indicator that the user intends that the information contained in the collection be considered complete.

Using placement legend 202 shown in FIG. 2, a stamp can be added to any corner of the second collection coversheet or it can be placed at an angle across the other items in the collection like the word "Watermark" shown in the placement indicator area. Other placement legends may be used to locate stamps in other locations and other orientations (e.g., vertical) on collection coversheets.

Note that in one embodiment, multiple stamps for the stamp sheet may be added to a collection at the same time by selecting the check boxes associated with the stamps. When more than one stamp is added, in one embodiment, all the stamps are added as a group in the location specified by the checkbox in the placement indication area. In one embodiment, if no checkbox is found to be indicated in the placement indication area, the stamps are added to any available location in the new collection. Alternatively, in such a case, the stamps are added in a default location in the new collection.

Figure 3:
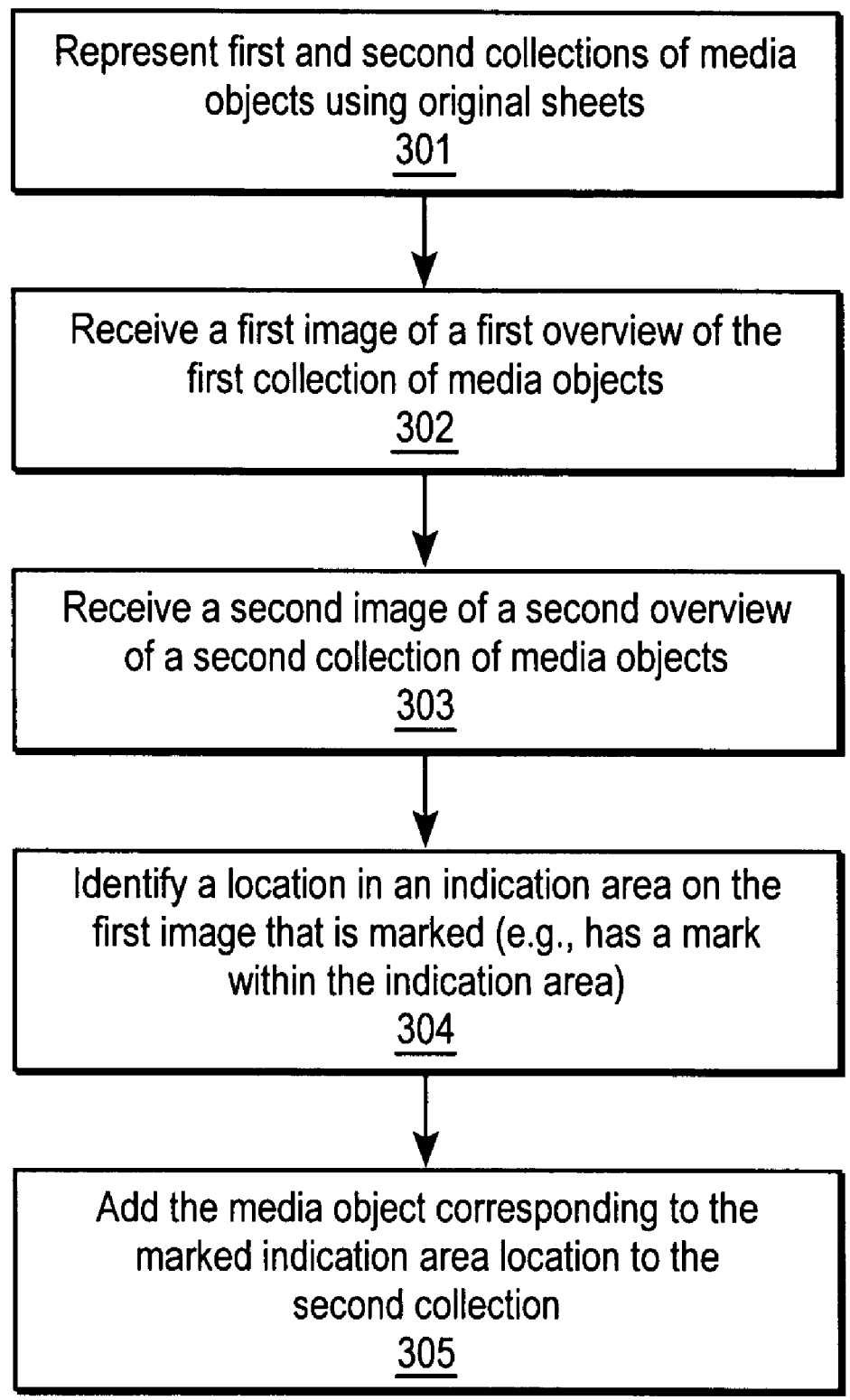
FIG. 3 is a flow diagram of a process for adding a stamp image to a collection of media objects.

FIG. 3 is a flow diagram of a process for adding a stamp image to a collection of media objects. The process is performed by processing logic that may comprise hardware (e.g., circuitry, dedicated logic, etc.), software (such as is run on a general purpose computer system or a dedicated machine), or a combination of both.

Referring to FIG. 3, the process begins by processing logic representing first and second collections of media objects using original sheets (processing block 301). The first collection is a collection of stamp images, while the second collection is a collection to which one or more of the stamp images selected from the first collection are added. In one embodiment, the graphical content in the image corresponding to the collection of one or more stamps comprises at least one image, symbol, word or portion thereof. The image, symbol, word or portion thereof may comprise "urgent", "confidential", "paid", "posted", "FYI", "received", "rec'd", "faxed", "complete", "approved", $, ! or another image or symbol.

In one embodiment, each sheet has an identifier and a graphical content representing the media objects. In one embodiment, the identifier comprises a machine-readable identifier (e.g., barcode). Alternatively, the identifier may comprise a radio-frequency identifier (e.g., RFID). In one embodiment, the machine-readable collection identifier specifies a storage location for the collection. In one embodiment, the process includes processing logic retrieving the at least one document from the storage location.

Next, processing logic receives a first image of a first overview of the stamp image collection of media objects (processing block 302) and receives a second image of a second overview of a second collection of media objects to which one or more stamps is to be added (processing block 303). In one embodiment, each of the overviews comprises a collection coversheet.

In one embodiment, processing logic receives a first image of a first overview of the first collection of media objects by capturing the first image of a sheet and identifying the collection associated with it. Processing logic receives a second image of a second overview of the second collection of media objects by capturing a second image of a sheet and identifying the collection associated with it. The first and second images may be captured by scanning their sheets one after the other (i.e., one on top of the other) using a scanner.

In one embodiment, the graphical content in the image of the stamp image collection includes one or more stamp images. That is, the image is a visual representation of a collection of one or more stamp images that may be added to a collection. Processing logic may use the machine-readable identifier to determine that the image corresponds to a stamp coversheet. In one embodiment, the graphical content of the stamp images is stored electronically and the machine readable identifier indicates the location of the electronic stamp images. The electronic collection may also contain a map that indicates the location of each stamp in the image of the stamps in the collection coversheet.

After obtaining images of the stamp collection and the document collection, processing logic identifies a location in a stamp indication area on the stamp image collection that is marked (e.g., has a mark within a check box in the stamp indication area) (processing block 304). The location in the stamp indication area is associated with graphical content representing at least one of the stamp images (e.g., media objects) in the stamp image collection. In one embodiment, the stamp indication area comprises one or more check boxes in the stamp image collection, where each of the check boxes is associated with a graphic in the image that is associated with each of the stamp image media objects in the stamp image collection.

In one embodiment, processing logic identifies the location by identifying one location in a stamp indication area (e.g., the area listing the stamp images) having a first mark therein and a second location in a placement indication area having a second mark therein. The first mark indicates the selection of the graphical content of one or more stamp image media objects to be added into the second collection and the second mark indicates the selection of a location in a visual representation of the second collection for the graphical content of one or more stamp image media objects to be annotated.

In one embodiment, locating marked check boxes is performed using morphological operations well known to those skilled in the art. More specifically, a program performing morphological operations takes an input image and a "kernel" that resembles the object that is being sought, namely a check box of a given size in this case and compares the kernel with the input image at every pixel. Every time the kernel at a given position in the image exactly matches the input image, it leaves a dark pixel in the output image. In other words, the output image has a dark pixel in every place a check box appears in the input image. Processing logic can search for pixels in the outcome image after comparison and produce a list of image coordinates where there are marked check boxes.

In one embodiment, each collection, including stamp collections, holds a map file or map data that indicates where the thumbnail of each item or stamp is displayed on the overview. This map holds the relationship between items and their coordinates in the overview. Using the map, in one embodiment, it is not necessary to search for the checkboxes in the image. It is possible to calculate exactly in the image where the checkboxes are and it is possible to check to see if the checkboxes have been marked by looking only inside the checkboxes.

Once the location has been identified, processing logic adds the stamp image media object corresponding to the marked indication area location to the second collection (processing block 305). This involves several steps spelled out in other related patent applications as follows. To add a stamp object or item to a collection, a new version of a collection is created containing all of the original objects in the collection and the stamp item. The thumbnail of the stamp item is placed in the overview of the new version of the collection either based on the location specified in the placement indication area of the stamp sheet or optionally in any available or a default location in the overview. A new collection coversheet is created of the new version of the collection that shows the newly added stamp thumbnail. The machine readable identifier on the new coversheet corresponds to the new version of the coversheet.

One of the advantages of the using this system for stamping collections is that a set of collections can be searched electronically to identify all collections containing a certain stamp. For instance, in an accounting environment, all collections representing PAID invoices can be found by searching for all collections containing the PAID stamp. In one embodiment, all incomplete collections can be found by searching for all collections not containing the COMPLETED stamp. Since the stamps are electronic, the search can be precise, looking for collections containing a stamp file with a certain name and size containing exactly the same image.

More specifically, searching a list of collections is trivial because a list of collections can be simply a list of DRIs that point to those collections. In one embodiment, searching the collections includes inspecting each DRI in the list and going to the storage location associated with that DRI. Once at the storage location, a search is made through the list of media objects to determine if one of the media objects matches the object of the search. The object of the search can be specified by marking a checkbox in a stamp sheet or in any regular collection. Since the media object is an exact copy of the media object specified as part of the search, comparison is trivial and can be done by looking at the size of the media object and then the individual bits or some precomputed checksum of the entire file. All of these techniques are simple and well known in the art. Those DRIs that match the search criteria can be added to a list that is returned to the requestor. It is also possible to do an image-based search where an image similarity comparison is done and, based on some similarity metric, a DRI is either added to the results list or not.

In one embodiment, the search process can be activated using a stamp sheet containing a thumbnail of the stamp and a checkbox. In one embodiment, the box next to one of the stamps can be checked, the collection coversheet can be scanned, and all collections containing that checked stamp can be produced as a result of the search.

After being marked and used, the stamp sheet may be reprinted and used in the future so that the next time the user can add one of the stamps to a collection. In such a case, the user could choose a different stamp or a different placement.

In one embodiment, the person using the stamp sheet saves the sheet for use in the future to place the same stamp at the same location in another collection. The stamp sheet may be saved in electronic form, such as in a memory of the system (e.g., MFP) that created it.

Creating a Stamp Sheet

Figure 4:
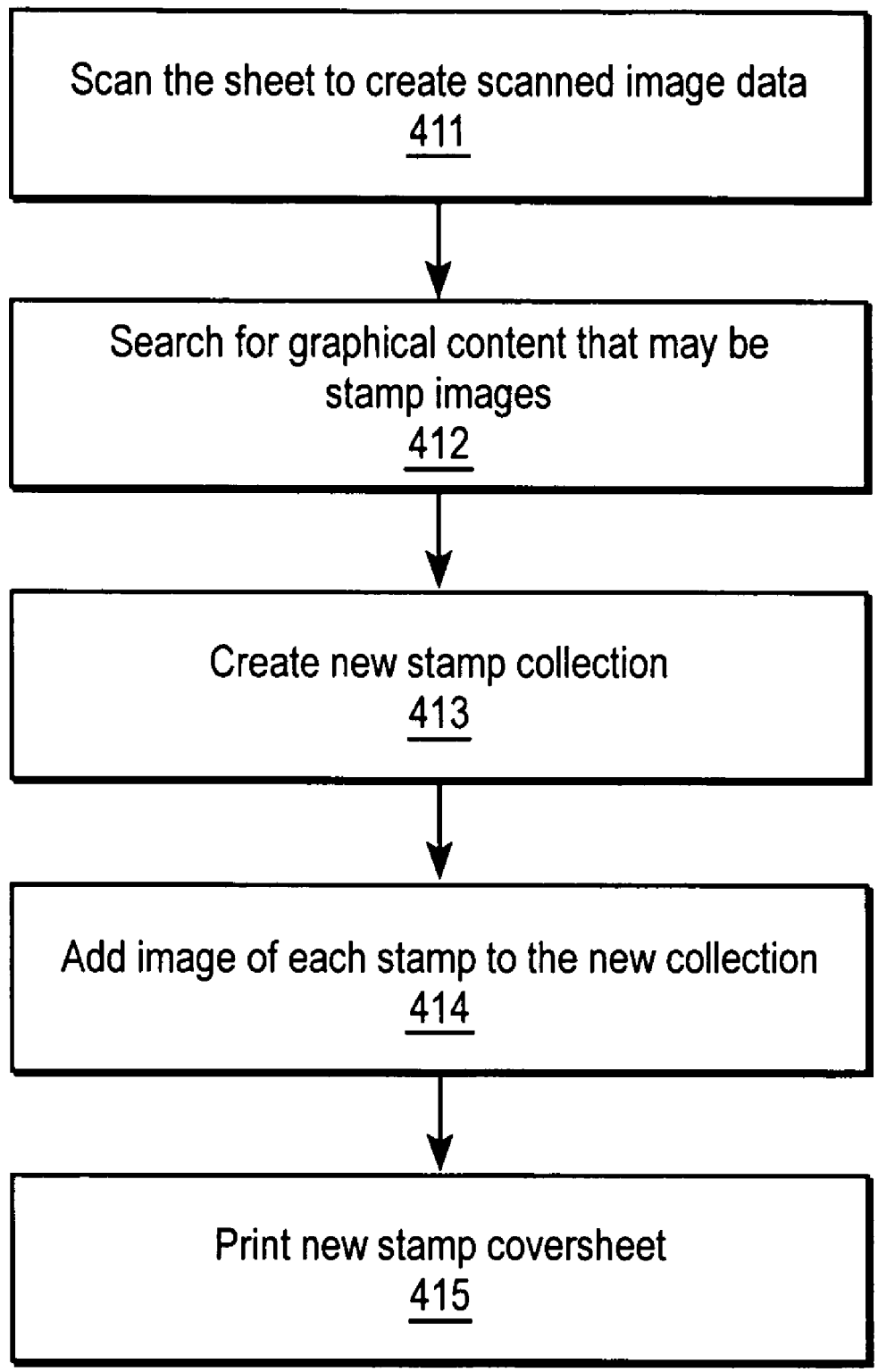
FIG. 4 is a flow diagram of a process for creating a stamp sheet from a set of images on a sheet.

In one embodiment, a set of stamp images on a sheet may be converted into a stamp sheet. FIG. 4 is a flow diagram of one embodiment of a process for converting a sheet of images into a stamp sheet. The process is performed by processing logic that may comprise hardware (e.g., circuitry, dedicated logic, etc.), software (such as is run on a general purpose computer system or a dedicated machine), or a combination of both.

Referring to FIG. 4, the process begins by processing logic scanning the sheet to create scanned image data (processing block 411). Once scanning has been completed, processing logic searches for graphical content that may be stamp images (processing block 412). The results of the search culminate in a group of scanned images. There are many methods for isolating separate images from a single scan. In one embodiment, processing logic searches the scanned image for a single point (e.g., pixel) that is not the background color. Starting at that pixel, processing logic creates a bounding box around that pixel and then expands the bounding box to cover all surrounding pixels that are not of the background color. Once all surrounding pixels are of the background color, the bounding box is no longer extended and the image contained within the bounding box is considered to be a stamp. This is just one example of many techniques well known in the art for isolating independent images within a page of scanned images. There are many different ways to isolate each stamp that are well known in the art.

Optionally, it is possible to look at the primary directions within the image and rotate the stamp images to align with the vertical and horizontal axes. This can be done using an edge detection filter followed by a Hough Transform which will find the lines in the image and create what is essentially a histogram of line position and angle. By searching the Hough Transform histogram, it is possible to determine the primary direction of the majority of lines in the image. Assuming that the primary direction of the lines should be horizontal and vertical, the image of an individual stamp can be reoriented or rotated so that most of the lines are horizontal and vertical. This method is well understood in the art and is an optional step in the process of creating a new stamp sheet based on images of the stamps.

Once the individual stamp images have been isolated, each stamp image is stored in an separate file. Processing logic then creates a new collection to hold the stamps (processing block 413). When a collection is created, a location on a server is reserved to hold the stamp images. Processing logic stores each of the stamp image files in the collection on the server (processing block 414). Thumbnails of each stamp are created and also stored in the collection. The thumbnails of the stamps are arranged and placed on the coversheet so that each stamp image is shown in a separate location on the coversheet. Processing logic prints the coversheet, and this coversheet can be used to add stamps from this collection into other collections.

Alternative Stamp Processing

Some people prefer to work using paper and physical stamps instead of electronic media and computers. In some cases, it is possible to detect a stamp placed on a collection coversheet and add an electronic version of that stamp to a collection, creating a new version of that collection containing the electronic stamp.

In one embodiment, a collection coversheet is stamped physically using a rubber stamp, perhaps of the type commonly found in office environments. After stamping, the coversheet includes an image of the rubber stamp. The coversheet is scanned, and as long as the machine readable identifier is not obscured by the stamp, the collection associated with the coversheet is identified. The electronic version of the collection has enough information associated with it to recreate the coversheet or, in one embodiment, might have a pre-calculated image of the coversheet stored with the electronic collection. The scanned image of the stamped coversheet can be compared to the stored or generated image of the coversheet and the difference between the two can be calculated.

The difference image will contain an image of the stamp that was physically stamped on the coversheet. If the stamp contains a word, OCR can be performed on that stamp to determine which stamp it is. The results of the OCR can be compared to a list of stamps already contained in the system, and when a match is found, the matching electronic stamp can be added to the collection represented by the coversheet and a new coversheet printed.

In one embodiment, an image comparison is performed. When the difference image is found, unique properties of the difference image can be calculated. For instance, the external shape of the image can be calculated by using a filter such as, for example, an edge detection filter using techniques well known in the art. Using edge detection, the image could be converted to a set of vectors. These vectors can be compared to vectors from a set of existing electronic stamp images processed in the same way and if the vectors closely match (e.g., based a threshold), the images are considered to match also. Alternatively, the scanned stamp image can be rotated and scaled to fit into a specific bounding box and it can then be compared to known stamp images. For instance, the scanned image can be scaled and rotated into a bounding box, the image can be converted to binary and noise can be removed using morphological operations is well-known in the art. The resulting image can be compared to known images in one or more orientations (e.g., as many orientations as necessary). If one is found to match, meaning that there are some number of pixels which are the same in the scanned image compared to the stored image of a stamp, the matching electronic stamp is added to the collection. Image matching techniques and algorithms are well known in the art. The preceding descriptions are given as examples, but many other ways of comparing two images are possible and are well understood by those versed in the art of image processing.

In another embodiment, traditional stamps applied to a sheet may be used and automatically added to the collection. More specifically, if one or more physical stamps are made on a sheet (e.g., a collection coversheet), the stamps may be detected when the coversheet is placed in the system (e.g., MFP) and a stamp image is added to the collection that corresponds to the sheet.

In one embodiment, an MFP determines whether a collection coversheet has a stamp on it after scanning in the coversheet by reading the DRI barcode to determine which collection is represented and then looking for differences between the scanned image of the coversheet and the coversheet that would be printed out. Once a stamp is found, the MFP detects which stamp has been added by comparing its digital signature with stored signatures of multiple stamps. Once identified, the MFP adds the electronic version of the stamp to the collection. Note that, optionally, the MFP forwards the stamped collection to individuals on the recipients' list of the collection as well as a list or database containing all related documents. An example may clarify this technique. Assuming the coversheet is a purchase request form that has been stamped "APPROVED" or "REJECTED". After scanning in the coversheet, the MFP determines whether the purchase request for has been stamped "APPROVED" or "REJECTED". Then the MFP adds the corresponding electronic version of the identified stamp to the electronic version of the collection coversheet, and the updated coversheet is forwarded onto other individuals in the purchasing department to continue the workflow.

Figure 5:
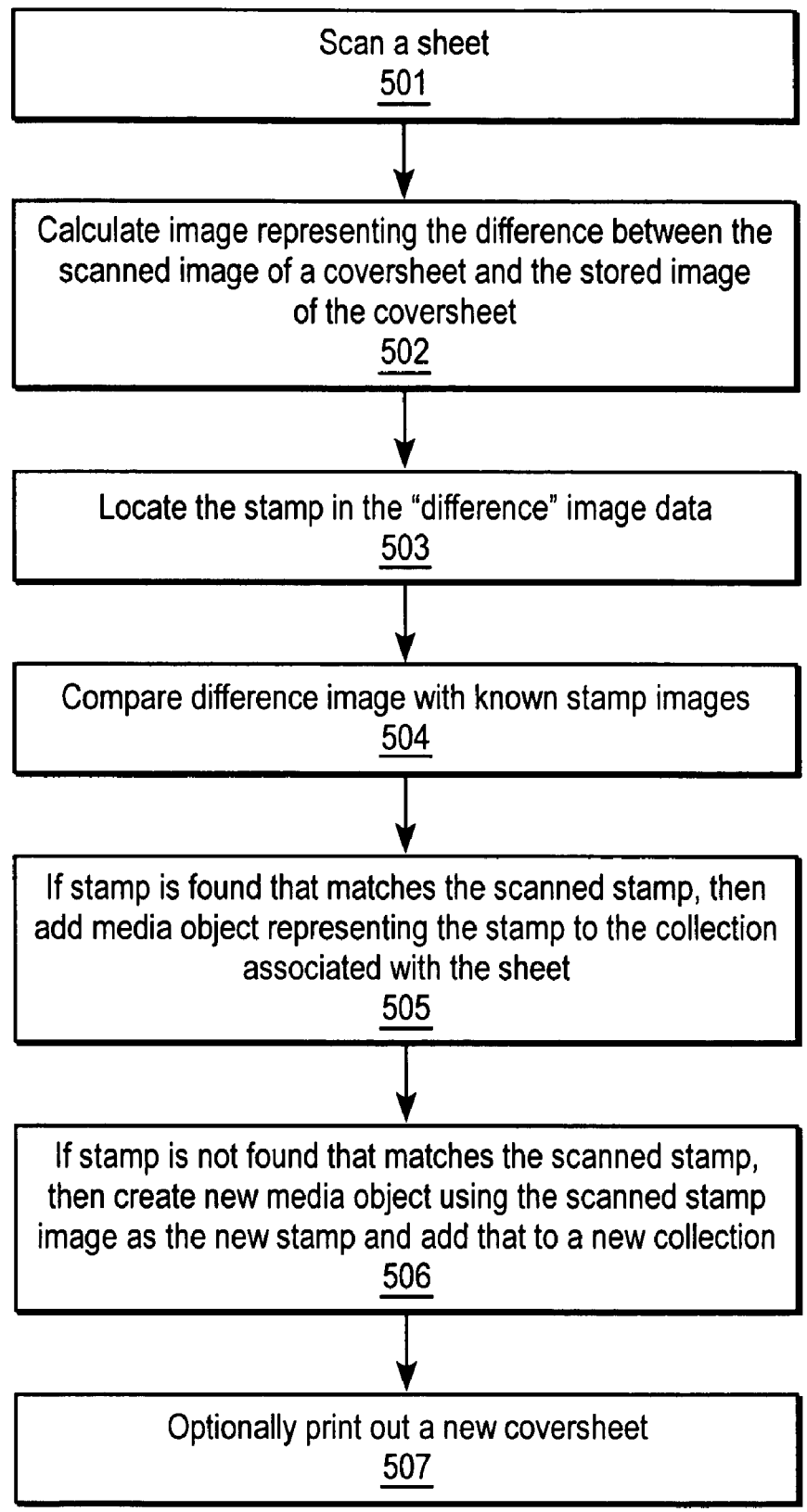
FIG. 5 is a flow diagram of a process for processing a sheet with one or more stamps applied physically to the sheet.

FIG. 5 is a flow diagram of a process for processing a sheet with one or more stamps applied physically to the sheet. The process is performed by processing logic that may comprise hardware (e.g., circuitry, dedicated logic, etc.), software (such as is run on a general purpose computer system or a dedicated machine), or a combination of both. In one embodiment, the processing logic comprises a MFP.

Referring to FIG. 5, the process begins by processing logic scanning a sheet (processing block 501). In one embodiment, the sheet comprises a coversheet. In one embodiment, processing logic calculates an image representing the difference between the scanned image of a coversheet and the stored image of the coversheet (processing block 502). Next, processing logic locates the stamp in the 'difference' image data (processing block 503). In one embodiment, locating the stamp may be based on image similarity (e.g., signature comparison) or through the use of a machine-readable stamp, thus not requiring a difference image to be calculated. In one embodiment, after locating the stamp, processing logic compares the image with known stamp images (processing block 504). If a stamp is found that matches the scanned stamp, processing logic adds the media object representing the stamp to the collection associated with the sheet (e.g., the collection associated with the coversheet) (processing block 505). If a stamp is not found that matches the scanned stamp, then processing logic creates a new media object using the scanned stamp image as the new stamp and adds that to a new collection (processing logic 506). In one embodiment, the electronic stamp is added instead of the image of the stamp and an image of the electronic stamp is added to the collection instead.

After the image of the stamp or the electronic stamp matching the stamp in the scanned image data is added to the collection, processing logic optionally prints out a new sheet (processing block 507).

The process of FIG. 5 has a number of advantages. For example, this process allows a paper workflow to occur within an electronic process. Also, using this process, the advantages associated with an electronic workflow, including distribution and notification, are maintained.

It will be apparent to those skilled in the art that the only requirements of a stamp are that it have a visual representation that can be stored in a collection. Stamps can be created from sheets with images or can be created electronically. Some embodiments of this invention may include stamps that also contain additional information, like metadata or additional documents linked to the visual representation in the collection.

Alternative Embodiments

In one embodiment, the stamps are used to distinguish similar looking collections. For example, company logos could be added to collections representing transactions with those companies. Subsequently, a set of collections may be scanned visually to located documents for a specific company. For instance, if a group of collections include the purchase orders for a particular company, a user may examine the collection cover sheets and quickly identify those purchase orders for the particular company.

Exemplary Systems

The use of check boxes is described herein in the context of a system 600 including scanner 604, a machine-readable code locator and reader 606, a marked check box locator 607, a document identifier and processor 613, and printer 615. Marked check box locator 607 may also include functionality for locating collection overview area 603 within collection coversheet 601; alternatively, such functionality may be provided in a separate component (not shown).

System 600 may also contain other components, some of which may not be required for the operation of this invention. System 600 may contain a network interface card (not shown), which can receive processing requests from the external network, a fax interface, media capture devices, a media capture port, and the like.

Control interface 617 provides a mechanism by which the user can initiate, configure, monitor, and/or terminate system 600 operations, for example, to make copies, scan documents, and print faxes. In one embodiment, interface 617 includes a keypad, display, touchscreen, or any combination thereof.

Figure 6:
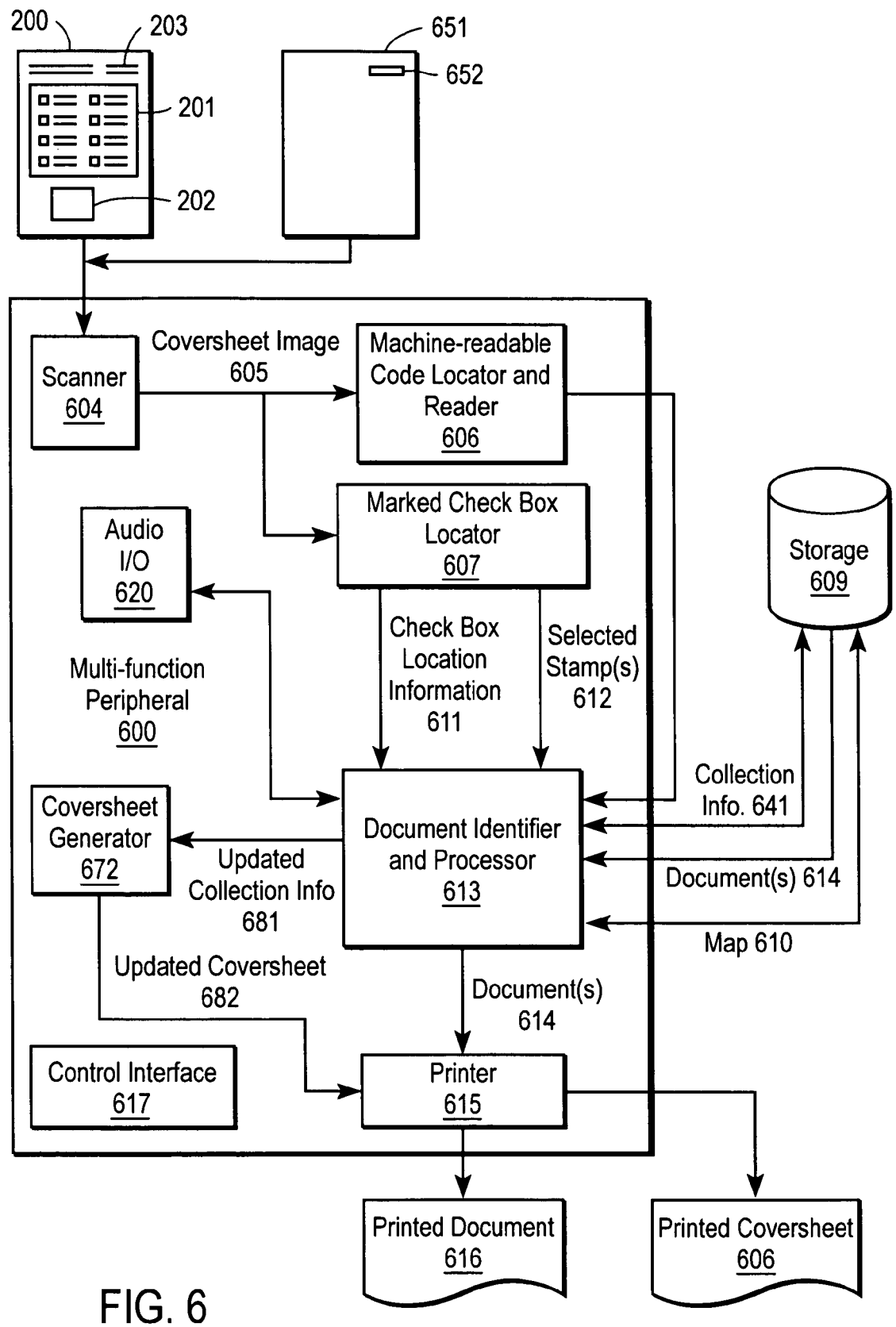
FIG. 6 illustrates an example of a typical MFP.

The components shown in system 600 are functional components that may be implemented using any combination of hardware elements, software, or the like. For example, the functionality of reader 606 and locator 607 may be implemented within a single hardware component and/or software module, or they may be broken out into separate functional components. Accordingly, the architecture shown in FIG. 6 is intended to illustrate the overall functionality of the invention according to one embodiment, and is not intended to limit the scope of the claimed invention to any particular set of components.

In one embodiment, system 600 can access other forms of media through electronic data input peripherals (not shown) including, for example, magnetic media readers for magnetic media such as floppy disks, magnetic tape, fixes hard disks, removable hard disks, memory cards, and the like. Peripherals may also include optical media readers (not shown) for optical storage media such as CDs, DVDs, magneto-optical disks, and the like. In addition, in one embodiment, system 600 is communicatively coupled to storage device 609, which may be a hard drive or other device capable of storing collections of digital documents, for example in database form. Storage device 609 may be at the same location as system 600, or it may be remotely located, connected for example via a network.

As described above in connection with FIGS. 1 and 2, a collection coversheet 200 includes machine-readable collection identifier 203 and collection overview area 201 containing thumbnail representations of stamps. Alternatively, collection coversheet 200 may have an embedded RFID tag containing collection identifier 203. Check boxes are included on coversheet 200 and may be marked to point to one of stamp thumbnails, thus identifying a particular stamp as the target to be added to the collection represented by collection coversheet 651 specified by marking one or more of the check boxes in a stamp selection area.

System 600 receives an image 605 of coversheet 200 (or of coversheet 651), for example by scanning coversheet 200 (or coversheet 651) using scanner 604 according to techniques that are well known in the art. Alternatively, system 600 may use other input mechanisms known to persons of ordinary skill in the art to receive the image of coversheet 601. For example, MFP 600 may receive the image via e-mail, fax, retrieval from previously stored coversheet images, or the like.

System 600 then locates collection identifier 203 within the image of coversheet 200 and collection identifier 652, and reads the identifiers 203 and 652. In one embodiment, the reading is performed by passing image 605 or the physical page in the case of RFID to code locator and reader 606, which locates and reads collection identifiers 203 and 652. Collection identifiers 203 and 652 identifies the storage location of documents in the collection. In one embodiment, identifiers 203 and 652 are URLs or the like that identifies documents by location and filename. For example, identifiers 203 and 652 may identify documents within storage device 609. In one embodiment, identifiers 203 and 652 also identify a map that associates documents with particular regions within collection overview 201 and 651.

Code locator and reader 606 passes the read collection identifier 602 to document identifier and processor 613 as described in more detail below.

System 600 locates collection overview 201 within image 605 of coversheet 200, for example by determining the overall size and shape of overview 601. In one embodiment, overview 201 is provided at a standard location within coversheet 200, or is color-coded or otherwise marked, so as to facilitate easier identification of overview 201. Alternatively, overview 601 can be at an arbitrary location and have arbitrary characteristics. The same processing is applied to collection overview 201.

System 600 locates check box(es) that have been marked on collection overview 601 using marked check box locator 607. This may be performed in response to the user specifying, via control interface 617, that one or more marked check boxes are present. Alternatively, locator 607 may be configured to automatically attempt to locate marked check boxes whenever a coversheet 200 has been scanned by scanner 604.

In one embodiment, marked check boxes are recognized by check box locator 607. Alternative methods for locating objects in an image are known in the art or have been described in related co-pending applications.

Based on which of the check boxes have been marked in the stamp indication area of coversheet 200, check box locator 607 identifies the desired stamp(s) to be added to the collection associated with the collection represented by coversheet 651. In one embodiment, marked check box locator and reader 607 passes the selected stamp 612 to document identifier and processor 613.

In one embodiment, storage device 609 includes a map 610 corresponding to each collection; the map provides coordinates for thumbnails 603 within overview 201. Thus, two-dimensional coordinates within overview 201 identify (or map to) documents, based on the locations of thumbnails 603 for those documents. In one embodiment, the map is implemented as a list of rectangles, one representing the entire collection overview 201, and other rectangles representing positions of document thumbnails 603 within the overview 201. Map 610 may be stored as a separate file, such as a Scalable Vector Graphics (SVG) file containing a description of collection overview 201 with identifiers that associate regions within the overview 201 with documents in the collection. Alternatively, map 610 may be stored as part of collection information. The same is true for overview 652.

Document identifier and processor 613 uses collection identifier 602 (obtained from code locator and reader 606) to retrieve, from storage 609, map 610 indicating the correspondence of coordinates within collection overview 201 to collection documents. Based on the map and based on marked check box location information 611, document identifier and processor 613 determines a target stamp image. If a marked check box is within a rectangle representing a document thumbnail 603, the corresponding document is deemed to be the target of the action. Alternatively, in such a situation where ambiguity exists as to whether a stamp image is the target stamp, system 600 can: prompt the user, via control interface 617, to specify whether the document is intended to be the target.

Once target stamp(s) have been determined, document identifier and processor 613 uses collection identifier 203 (obtained from code locator and reader 606) to retrieve, from storage 609, the target collection and adds the specified stamp(s). In one embodiment, document identifier and processor 613 first retrieves collection information 201, which includes or points to target document(s), and then obtains target document(s) accordingly.

Document identifier and processor 613 modifies collection map 650 and overview 651 to indicate locations of thumbnails corresponding to new stamp images. The updated collection info 651, map 610, and/or overview 651 for the second collection are stored in storage device 609. Optionally, the updated collection information 651 and map 610 are sent to coversheet generator 662 for generation of an updated coversheet including a new overview for the collection that has the added stamp images, as described below.

Printer 615 may optionally (or automatically) print 612 a new collection coversheet 660 representing the collection, particularly if collection organization has been modified, or if check boxes have been marked.

In one embodiment, when collection organization is modified (such as by changing hierarchy, layout, or access levels), a new version of the collection is created. Thus, rather than overwriting the collection with new information, an updated version of the collection is generated and stored in a new location within storage 609, and a new collection identifier 652 is generated that points to the new location. A new coversheet is printed with the new collection identifier. In this manner, previous versions of collections are preserved.

In one embodiment, system 600 includes coversheet generator 672, either as a separate functional module or as a component of document identifier and processor 613 or some other component. Coversheet generator 672 is therefore an optional component that need not be included, and indeed is absent in some embodiments. When included, coversheet generator 672 receives updated collection information from document identifier and processor 613, modify collection map 660, and generates an updated coversheet to be sent to printer 615 to be output as printed coversheet 666.

Figure 7:
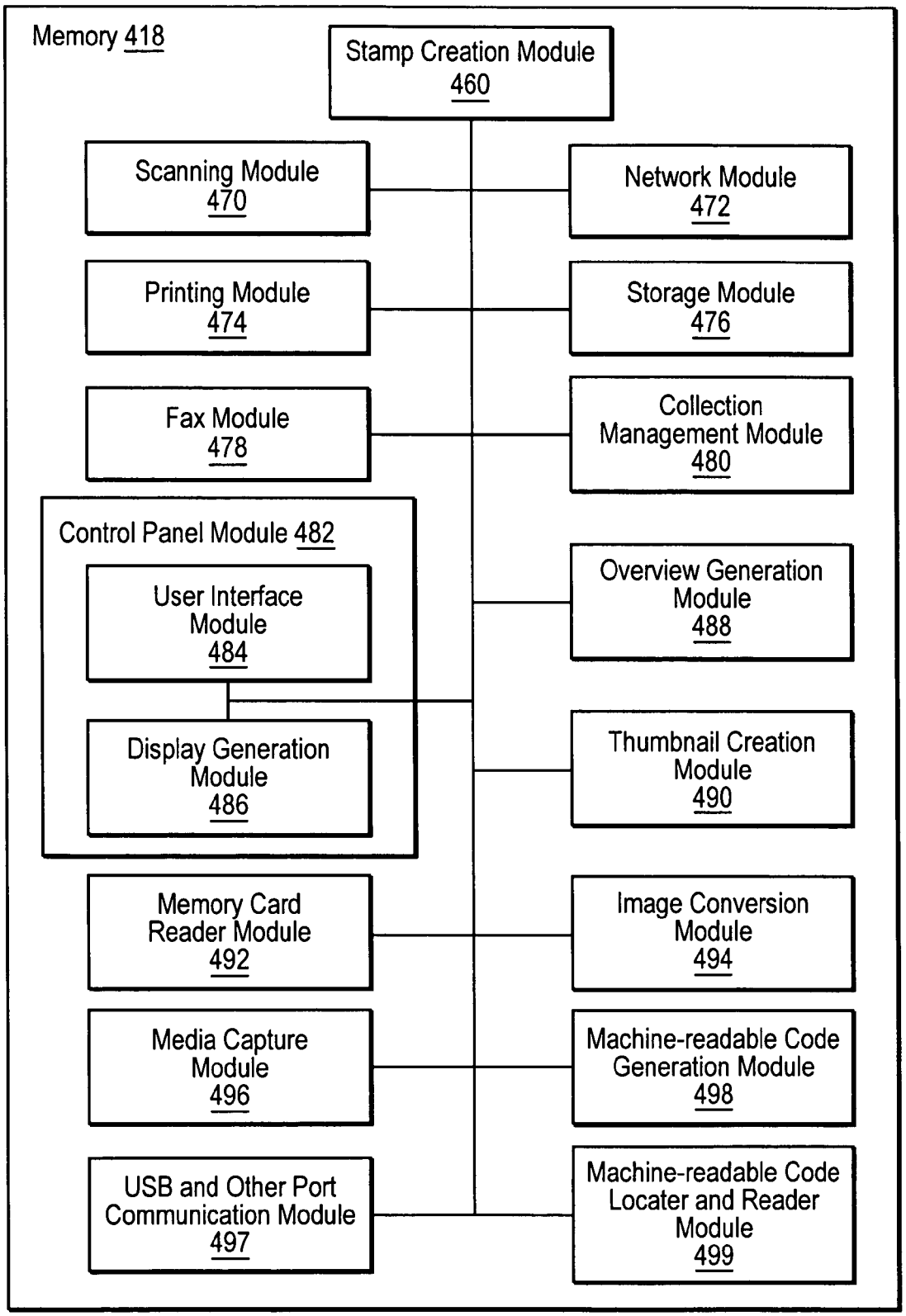
FIG. 7 is a high level representation of various program modules for operating an MFP.

FIG. 7 is a high level representation of various program modules resident in memory 418 for operating the MFP in accordance with the different aspects of the present invention. The scanning module 470 contains the instructions that the MFP in combination with the scanner 442 can use to scan pages of documents. The printing module 474 contains control instructions for receiving an image or a description of an image and driving the marking unit 504 causing the image to be printed on a piece of paper. MFPs are known in the art and made by many different companies so a complete description of the operation of the MFP is not necessary. The fax 478, network 472, storage 476, image conversion 494, memory card reader 492, media capture 496, USB and other port 497 modules will not be described because their purpose and function is well understood.

A stamp image creation module 460 creates the stamp image. The stamp image creation module 460 performs the functions described above.

In addition to the typical MFP functions, the following modules are used for the operation of this invention. A collection management module 480 is available, which tells the processor how to communicate with the collection server and how to create and modify collections, including adding the stamp image into the collection.

A thumbnail creation module 490 can create thumbnail representations of media, including a smaller version of an image, a single-frame from a video or even a waveform from a stored audio signal. These thumbnails are used at least by the overview generation module 488, which is used to create an overview of a collection. The overview is described in detail later and the overview generation module puts together the thumbnails representing the documents and media into a single image that can be displayed or printed and used for accessing the documents and media.

The machine-readable code generation module 498 provides the MFP with the ability to create machine-readable codes like barcodes that represent specific collections. The machine-readable code locator/reader module can be used to find and decode machine-readable codes on collection coversheets in order to determine which coversheet was scanned by the scanning mechanism 604. Preferably, machine-readable codes are barcodes, though there are many ways of creating machine-readable indicia. Barcodes are robust and take up little space and are easily decoded using standard hardware and software. One company that sells software for locating and decoding a variety of barcodes is Tasman Software of Leeds, United Kingdom. Software for creating and printing barcodes can be purchased from IDAutomation.com, Inc. of Tampa, Fla. Decoding machine-readable codes is well known in the industry.

The control panel is controlled by a processor (e.g., processor 812) using information from the user interface module 484 and the display generation module 486, which are part of the control panel module 482.

In one embodiment, the stamp image (e.g., media object) is stored electronically in the collection.

Coversheets

A collection coversheet is a paper that represents a collection and, in one embodiment, comprises a header, a string of text printed in a machine-readable format, a collection overview image, optionally, an area in which notes may be written, and optionally a human-readable version of the text encoded in the machine-readable code.

As discussed above, FIG. 2 illustrates an exemplary cover sheet representing a collection of information. The header contains printed information about the collection. This information may include the author of the collection, a list of zero, one or more people who will be notified if the collection is modified, time and date information about when the collection was last modified or when this coversheet was printed out, and an optional collection topic or subject.

In one embodiment, the machine-readable code contains an encoded version of a unique pointer to the collection on the collection server. In one embodiment, this same pointer when presented in the human-readable form is similar to a uniform resource locator or URL used in the World Wide Web and is referred to herein as a collection identifier, distributed resource identifier, or DRI. In one embodiment, a collection server uses these DRIs as unique collection pointers. In one embodiment, DRIs are globally unique, difficult to guess, and can provide access to collections from anywhere on the Internet.

Within this specification, the terms "collection identifier," "distributed resource identifier," and "DRI" will be used interchangeably and should be understood to mean the same thing—a unique identifier that points to a collection of media and documents stored on a collection server. Also, the identifier might be written in human-readable form or machine-readable form. Both printed forms represent the same identifier and point to the same collection even though they look unlike each other.

In one embodiment, the DRI used for a collection points to a directory that contains the collection of documents as well as information used to build the collection overview and some additional metadata. DRIs can also point directly to an individual file the same way that a URL can point to either a directory or a file.

Since a collection typically comprises a multitude of documents, the DRI is often a directory reference rather than a reference to a particular file. For example, in an OS (operating system) such as Unix, the DRI can be a directory reference such as /usr/collection. Alternatively, the DRI can refer to a file that in turn leads to an identification of the constituent elements of a collection. In still another alternative, the DRI can be a reference to a database that stores the collection.

The text of the DRI 510 may comprise a string of characters that includes a random text component. This randomly (and thus, unguessable) generated text serves to prevent access to a collection because it is virtually impossible to guess.

The example DRI "/root/usr/collection" assumes a single-machine architecture. In a more generalized configuration of two or more machines, the DRI can include a machine name component. For example, a more accessible format such as the URL (universal resource locator) format for identifying World Wide Web (WWW) pages might be suitable. In one embodiment, the DRI constitutes the path portion of the URL. Purely by convention, the path portion uses the following naming format according to a particular embodiment of this aspect of the present invention:

.../-DDS-/ORIGIN/..., where DDS is the name of a particular repository of collections, and ORIGIN is the fully qualified hostname of the original server for the collection identified by the DRI.

Thus, for example, a collection may be identified by the following URL:

http://machine1.com/-msg-/machine2.com/2002/1022/298hy9y8h8Ka30eri/1/

The IP address of the machine is identified by "machine1.com." The path portion refers to a collection stored in a repository named "-msg-." The original copy of the collection (i.e., its place of creation) is located on a machine named "machine2.com." Thus, in this case, "machine1" contains a copy of the collection. In one embodiment, collections are contained in directories, though other data storage conventions can be used; e.g., collections can be stored and managed in a database. The collection shown in the example above is stored in a directory called:

"/2002/1 022/298hy9y8h8#$30er#/1/."

The pathname portion "/2002/1022" represents a date; e.g., date of creation of the collection. The string "398hy9y8h8#$30er#" represents randomly generated text. Finally, as will be discussed below, the directory represented by the terminal pathname "/1/" refers to the first (initial, original, base, etc.) version of the collection. p In one embodiment, both the host machine ("machine1") and the original machine ("machine2") use the following directory structure and URL naming structure. The host machine has a directory called "-msg-" contained in its respective "root" directory for storing collections. The "-msg-" directory has a sub-directory called "machine2.com" which contains all the collections originating on "machine2.com." Generally, a sub-directory is provided for each machine that can be an originator of a collection.

Given the DRI, a person or machine will have enough information to access the collection in order to add to or modify the collection.

Using a 2-D bar code representation of a DRI allows for automated access to the collection without requiring the user to manually enter the location. It can be appreciated of course that any machine-readable indicium can be used instead of a bar code system, including optical character recognition (OCR) of the human-readable DRI.

Using the MFP and/or the processing logic and the techniques described herein, it is possible to create and modify collections on a collection server, including adding a stamp image to a collection. A new, empty collection can be created. A new non-empty collection can be created using available documents and media. Electronic media and paper documents can be added to existing collections. A collection can be printed. Collections can be added to or merged. Also, actions can be taken on individual media in a collection using notes or actions selected on the coversheet.

In one embodiment, scalable vector graphics files or SVG files are used to represent the collection overview. SVG files are a standard way of creating a visual representation on the World Wide Web and there are many viewers and tools for creating SVG. A collection preferably includes a specially name SVG file which can be used to construct an overview image for the coversheet or any display. In one embodiment, the SVG file includes information for displaying the thumbnails of individual documents and media stored in the collection.

Metadata about the individual files in the collection and their relationship to other files in the collection is stored preferably in an XML (extensible markup language) file. In one embodiment, this information includes image width and height, links between images and their thumbnails and links between a document and an image representing that document. The exact format is unimportant as long as the collection server understands how to read and write the format.

Additional information related to the collection as a whole can also be stored in the metadata file. This information might include the time at which the message was created, the subject of the message, the name of the author of the collection, and contact information such as email addresses, fax numbers, etc. belonging to those who should be notified when a collection is altered.

While creating a new collection, either a printout is generated or the information about the new collection, including at least the DRI is emailed or faxed to someone. Otherwise, the DRI will be lost to all but the collection server and will not be available for adding documents because no one will have or be able to guess the DRI.

The MFP contacts the collection server through a network to request a new collection identifier or DRI. It should be understood that it is possible for the MFP to request identifiers in advance so that if the collection server is busy or temporarily offline, the MFP can still create new collections.

If the coversheet is to be printed, then the MFP composes a coversheet. In one embodiment, a header block is created comprising the date and time of the creation of the new collection. The DRI or identifier obtained from the collection server is added to the coversheet at the bottom in human-readable form and then encoded in an industry standard two-dimensional PDF417 type barcode in one embodiment and added to the upper right-hand corner of the coversheet. An SVG representing the overview is converted to image form and added to the appropriate place in the coversheet. Additional information might also be added as deemed appropriate. The composition of the coversheet described here is one possibility but anyone skilled in the art will recognize that there are many ways to lay out or compose a coversheet that are within the scope of this invention.

The task of adding to an existing collection requires a collection to exist. In one embodiment, to add to that collection at the MFP, the user uses a coversheet from the existing collection. As mentioned, each collection identifier represents a single collection but collections can change over time. In one embodiment, each time a collection changes, the last path element in the DRI is modified. Those who have access to a single collection are thereby easily given access to all versions of that collection. In one embodiment, the version name or final pathname of /0/ has a special significance and means the "latest" or "most recently created" version.

In one embodiment, pathname /1/ indicates the first version of the collection, /2/ represents the second version, etc. When a new collection is uploaded to the collection server, a new directory using the next integer is created. The next collection after /2/ would preferably be called /3/. In order to maintain unique version numbers, it is essential that only one device, i.e., the collection server, create the version number of final pathname. The version number cannot be created by the MFP because multiple MFPs might generate a number at the same time and choose the same name. Instead, the MFPs create a collection and upload it to a temporary directory on the collection server and when everything is uploaded, the collection server moves it into place and assigns the final pathname.

In one embodiment, a thumbnail is created for each page or document or other media. The thumbnail is preferably a smaller version of the page that is similar in appearance but smaller in storage size and in number of pixels. With recorded audio, a thumbnail is just a representation of the audio and could be a waveform or even a standard computer icon representing the audio. In the preferred embodiment, the audio could be displayed as a rectangle containing a waveform whose shape is based on the audio content and whose length corresponds to the duration of the audio recording: A video thumbnail could be a single frame or a small number of representative frames from the video composited into a single small image. Those who are skilled in the art will understand that there are many various ways of creating thumbnails to represent media.

All of the media and documents for the new collection including the stamp(s) are now added to the collection, which means that they are uploaded to the collection server and placed in the directory pointed to by the DRI of the new collection. There are many well-known protocols for uploading files to a server, including FTP, SCP, HTTP PUT. Preferably, the HTTP PUT protocol is used which allows the MFP to specify the location and contents of each media file as it is being uploaded.

The thumbnails representing the new media items are arranged in the collection overview. The thumbnails are placed in an appropriate manner within the overview, expanding the overview size if necessary.

The SVG file representing the overview is written and uploaded to the collection server and all of the thumbnails are uploaded.

One method for placing thumbnails is to find a place in the overview image where the thumbnail can be positioned where it will not overlap any other thumbnail. An exhaustive search—moving the thumbnail to different positions within the overview and looking for overlaps with other thumbnails—is too slow. Another approach is to reduce the problem to that of placing a single point. This can be done by reducing the size of the overview by the width and height of the thumbnail to be placed and enlarging the existing thumbnails by the same dimensions. The origin of the new thumbnail can be placed anywhere within the remaining space in the overview without overlapping existing thumbnails. This is known as a "configuration space" approach because instead of finding a new thumbnail location in the original two dimensional space of the overview, a new "available-space" region is calculated in which the origin of the thumbnail is placed instead of the entire thumbnail. Configuration space techniques for interference checking are well known in the field of robotics and path planning.

The size of the thumbnail to be added to the overview is determined. Thumbnail sizes are usually measured in pixels. Often thumbnails are chosen to be some standard size— chosen so that they neither the width nor height is larger than a certain maximum size—perhaps 150 pixels for standard display resolutions or two inches for printed thumbnails. Since some images might have a very large or very small aspect ratio. It might be more appropriate to limit the thumbnail to a maximum area—square pixels or square inches— rather than a maximum width and height.

Scaling an image so that it contains no more than some total number of pixels instead of restricting the width and height to be less than some maximum improves the overall appearance of the thumbnails and is the preferred method of selecting a thumbnail size. However, any method for choosing thumbnail sizes can be used for the present invention.

In one embodiment, a single bounding box for all the thumbnails previously placed on the overview is calculated and the origin of the new thumbnail is placed outside of that bounding box. It is also possible and understood by extension that instead of calculating just a single bounding box, an individual bounding box for each thumbnail may be calculated and extended so that the new thumbnail can be placed in any available position in the overview. This is well understood by those experienced with path planning algorithms and would be analogous to allowing a machine to travel between obstacles instead of requiring the robot to go around all the obstacles.

Adding a second new thumbnail now to the overview could be accomplished. However, instead of adding one bounding box to cover all the thumbnails, simply adding a single box representative of the newly added thumbnail is the preferred approach. This box is calculated to be the size of the newly added thumbnail and then is extended up and to the left by the width and height of the thumbnail to be added, just like the first bounding box.

All new thumbnails are uploaded to the collection server as well as the new overview description file and metadata file.

Modifying the overview could be accomplished using an object-based drawing tool like those available in Microsoft's PowerPoint software or Adobe Illustrator or similar tools. These tools and techniques are well understood by those skilled in the art.

All modified information is sent to the collection server, including the metadata files, SVG overview file, and any changes in the collection.

The advantage of having a machine-readable collection identifier on a coversheet is that the MFP or any device that can locate and decode machine-readable codes can determine which collection is represented by the coversheet. The user can indicate which collection the new media will be added to by typing in a collection identifier or DRI but this can be a difficult task because DRIs tend to be long random strings of characters. DRI's can be located and decoded from a scanned image or read using handheld barcode scanners if they are encoded in barcode format. Handheld scanners which read many different types of one and two-dimensional barcodes are available from many companies like Hewlett-Packard Company of Palo Alto, Calif., USA. They can also be read in text form using optical character recognition technology or decoded from a magnetic strip if properly encoded. If a coversheet of the collection is available, the coversheet should be placed on the MFP where it can be scanned, either in the automatic document feeder or directly on the glass platen. Alternatively, the barcode can be scanned using a handheld scanner. If the barcode has been captured in a digital image, perhaps using a digital camera, the camera can be directly connected to the MFP or a memory card from the camera can be plugged into a card reader. There are many other methods for presenting the MFP with a machine-readable DRI and those methods and techniques are not enumerated herein because they are understood by those skilled in the art.

In one embodiment, a machine-readable DRI is presented as part of the coversheet of the collection. In one embodiment, the DRI is contained in PDF417 format two-dimensional barcode on the coversheet and the coversheet is placed on an automatic document feeder (ADF) of the MFP.

Each of the documents and media is searched for a machine-readable DRI. When a bar-coded DRI is scanned using a handheld scanner, the DRI can be stored in the memory of the MFP so that it can be accessed when it is time to determine which collection to add the new media to. If the ADF or a platen has been used to scan in a coversheet or if the DRI is contained in an image from the digital camera, the DRI will have to be read from the scanned or captured image. Either source of a DRI is acceptable and typically, if there is no DRI held in a memory due to hand scanning of a coversheet, the first scanned sheet or first image will contain the DRI. Those skilled in the art will recognize that there are many ways of providing the DRI to the MFP an exhaustive list need not be provided.

It is important that the existing collection be changed in a way that makes the current state or version of the collection available at a later time. The new media should not be placed in the same storage area as the existing collection.

Typically, new stamps in a collection are uploaded to a staging area on the collection server. The staging area is associated with the collection identifier but doesn't have a permanent final pathname. As soon as all of the information has been uploaded and is complete, the collection server moves the collection into a final directory or storage area with a permanent final pathname. The permanent final pathname is usually the next integer after the most recently uploaded collection.

The thumbnails representing the new stamp(s) are added to the collection overview.

The thumbnails, metadata, and the overview SVG file, are uploaded to the staging area in the collection server. All changes and modifications are finally uploaded to the collection server and at this point, the server has everything required to move the collection out of the staging area and into the final directory upon assigning a version number.

A collection server can keep a mapping of collection identifiers to collection directories.

An Exemplary Computer System

Figure 8:
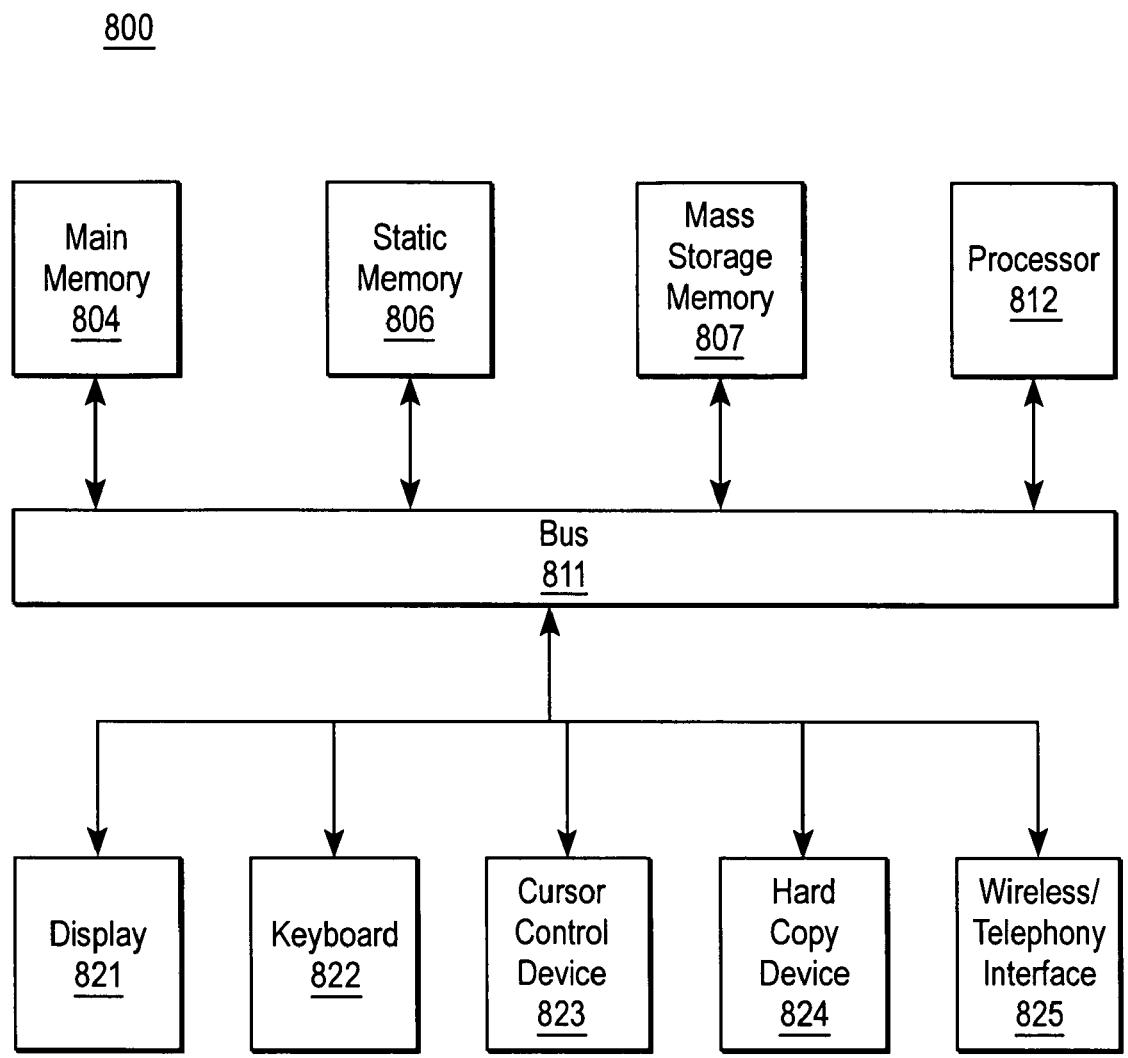
FIG. 8 is a block diagram of an exemplary computer system.

FIG. 8 is a block diagram of an exemplary computer system that may perform one or more of the operations described herein. Referring to FIG. 8, computer system 800 may comprise an exemplary client or server computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, PowerPC™, Alpha™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that may be coupled to bus 811 is hard copy device 824, which may be used for marking information on a medium such as paper, film, or similar types of media. Another device that may be coupled to bus 811 is a wired/wireless communication capability 825 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in themselves recite only those features regarded as essential to the invention.

We claim:

1. A method comprising:
 receiving a first image of a first overview of a first collection of first media objects, the first image having graphical content representing the first media objects and a first machine readable pointer to identify the first collection;
 receiving a second image of a second overview of a second collection of second media objects, the second image having graphical content representing the second media objects and a second machine readable pointer to identify the second collection;
 identifying at least one location in at least one indication area on the first image having a mark therein, the at least one location being associated with graphical content representing at least one of the first media objects; and
 adding the at least one of the first media objects associated with the at least one location in the at least one indication area having the mark therein to the second collection.

2. The method defined in claim 1 wherein the graphical content in the first image includes at least one stamp image.

3. The method defined in claim 1 wherein the graphical content in the first image comprises at least one word or portion thereof.

4. The method defined in claim 3 wherein the word or portion thereof comprises one selected from a group consisting of: urgent, confidential, paid, posted, FYI, received, faxed, complete, approved, top secret, denied, or equivalent thereof.

5. The method defined in claim 1 wherein the at least one indication area comprises one of a plurality of check boxes in the first image, wherein each of the plurality of check boxes is associated with one of a plurality of graphics in the image, wherein each of the plurality of graphics is associated with each of the media objects in the first collection.

6. The method of claim 1, wherein the second overview comprises a plurality of representations of documents.

7. The method defined in claim 1 wherein each of the at least one indication area comprises a check box.

8. The method defined in claim 1 wherein the machine-readable pointer comprises a barcode.

9. The method defined in claim 1 wherein receiving the second image of a second overview of a second collection of media objects comprises capturing the second image of a sheet and identifying the second collection.

10. The method defined in claim 1 wherein each of the first and second overviews comprises a collection coversheet.

11. The method of claim 10, wherein the second overview comprises a plurality of thumbnail depictions of documents.

12. The method of claim 1, wherein the second overview comprises a list of documents.

13. The method of claim 1, wherein the second overview comprises a plurality of thumbnail depictions of documents.

14. The method of claim 1, wherein the second overview comprises a plurality of icons representing documents.

15. An article of manufacture comprising one or more recordable storage media having instructions stored thereon which, when executed by a computer, cause the computer to perform a method comprising:
 receiving a first image of a first overview of a first collection of first media objects, the first image having graphical content representing the first media objects and a first machine readable pointer to identify the first collection;

receiving a second image of a second overview of a second collection of second media objects, the second image having graphical content representing the second media objects and a second machine readable pointer to identify the second collection;

identifying at least one location in at least one indication area on the first image having a mark therein, the at least one location being associated with graphical content representing at least one of the first media objects; and adding the at least one of the first media objects associated with the at least one location in the at least one indication area having the mark therein to the second collection.

16. A method comprising:
scanning a sheet that represents a collection in order to create scanned image data;
locating a stamp image on the sheet;
creating a second collection in response to the locating, to hold the stamp image; and
adding the stamp image as a media object to the collection.

17. The method defined in claim 16 wherein the sheet is a cover sheet.

18. The method defined in claim 16 further comprising identifying the stamp image.

19. The method defined in claim 18 wherein identifying the stamp image comprises matching a portion of the scanned image data with an electronic version of the stamp image.

20. The method defined in claim 18 wherein identifying the stamp image comprises:
performing recognition on the portion of the scanned image data; and wherein the stamp image is identified based on results of performing recognition.

21. The method defined in claim 16 further comprising creating a visual representation of the collection including the stamp image.

22. The method defined in claim 21 wherein the visual representation comprises a sheet.

23. The method defined in claim 21 wherein the visual representation comprises printing a sheet having the stamp image.

24. The method defined in claim 23 wherein the sheet comprises a cover sheet.

25. The method defined in claim 16 further comprising sending a notification to a set of locations to indicate that the stamp image has been added to the collection.

26. An article of manufacture comprising one or more recordable storage media having instructions stored thereon which, when executed by a computer, cause the computer to perform a method comprising:
scanning a sheet that represents a collection in order to create scanned image data;
locating a stamp image on the sheet;
creating a second collection in response to the locating, to hold the stamp image; and
adding the stamp image as a media object to the collection.

27. The article of manufacture defined in claim 26 wherein the sheet is a cover sheet.

28. The article of manufacture defined in claim 26 wherein the method further comprises identifying the stamp image.

29. The article of manufacture defined in claim 28 wherein identifying the stamp image comprises matching a portion of the scanned image data with an electronic version of the stamp image.

30. The article of manufacture defined in claim 28 wherein identifying the stamp image comprises:
performing recognition on the portion of the scanned image data; and wherein the stamp image is identified based on results of performing recognition.

31. The article of manufacture defined in claim 26 wherein the method further comprises creating a visual representation of the collection including the stamp image.

32. The article of manufacture defined in claim 31 wherein the visual representation comprises a sheet.

33. The article of manufacture defined in claim 31 wherein the visual representation comprises printing a sheet having the stamp image.

34. The article of manufacture defined in claim 33 wherein the sheet comprises a cover sheet.

35. A method comprising:
scanning a sheet having a one or more separate images; and
creating an overview of a collection of the one or more images that includes
a media object for each of the one or more images,
an identifier to identify the collection,
at least one first indication area with a first location associated with each of the one or more images to allow specification thereof via a first mark therein, wherein the specification using the first mark in the first location associated with an image of the one or more images causes the image to be added to a second collection; and
a second indication area in a second location to allow specification of the one or more images via a second mark therein, wherein the second mark indicates a third location of the one or more images in a visual representation of the second collection.

36. The method defined in claim 35 wherein the identifier comprises a machine readable pointer.

37. The method defined in claim 36 wherein the machine readable pointer comprises a bar code.

38. An article of manufacture comprising one or more recordable storage media having instructions stored thereon which, when executed by a computer, cause the computer to perform a method comprising:
scanning a sheet having a one or more separate images; and
creating an overview of a first collection of the one or more images that includes
a media object for each of the one or more images,
an identifier to identify the collection,
at least one first indication area with a first location associated with each of the one or more images to allow specification thereof via a first mark therein, wherein the specification using the first mark in the first location associated with a image causes the image to be added to a second collection; and a second indication area in a second location to allow specification of the one or more images via a second mark therein, wherein the second mark indicates a third location of the one or more images in a visual representation of the second collection.

39. The article of manufacture defined in claim 38 wherein the identifier comprises a machine readable pointer.

40. The article of manufacture defined in claim 39 wherein the machine readable pointer comprises a bar code.

41. A method comprising:
scanning a sheet representing a first collection of first media objects, the sheet including a machine readable collection identifier, a graphical representation of all the media objects in the first collection and a place to indicate a first media object of the first media objects that is of interest to be added to a second collection along with a location legend to allow a user to indicate a placement location of the media object in a visual representation of the second collection; and placing the first media object in the second collection based on results of scanning of at least of the location legend on the sheet.

42. A method comprising:

scanning a collection coversheet containing one or more media objects, the collection cover sheet including a place that selects a media object of the one or more media objects that is of interest;

identifying a media object in scanned data resulting from the scanning at least the place that selects the media object on the collection coversheet; and searching one or more collections lists for collections containing the identified media object.

43. The method defined in claim 42 wherein the object is a stamp image.

44. The method defined in claim 42 wherein searching the one or more collections comprises:

comparing media objects in the one or more collections in the list with the media object.

* * * * *